United States Patent [19]

Lorenz

[11] Patent Number: 4,689,882

[45] Date of Patent: Sep. 1, 1987

[54] HAND TOOL AND METHOD FOR REMOVING INSULATION FROM WIRE-WOUND IGNITION CABLE

[75] Inventor: Jerome L. Lorenz, Birmingham, Mich.

[73] Assignee: United Technologies Automotive, Inc., Dearborn, Mich.

[21] Appl. No.: 663,537

[22] Filed: Oct. 22, 1984

[51] Int. Cl.⁴ ............................................. H02G 1/12
[52] U.S. Cl. ...................................... 30/90.1; 81/9.51
[58] Field of Search ................... 30/90.1, 90.4, 90.2, 30/90.8; 81/9.51

[56] References Cited

U.S. PATENT DOCUMENTS

| | | | |
|---|---|---|---|
| 1,725,114 | 8/1929 | Gelderen | 30/90.1 |
| 2,897,702 | 8/1959 | Ghiglia | 30/90.1 |
| 3,204,495 | 9/1965 | Matthews | 30/90.1 |
| 3,304,605 | 2/1967 | Stark | 30/90.1 |
| 3,518,606 | 6/1970 | Barker | 338/270 |
| 3,528,325 | 9/1970 | Kamimura | 30/90.1 |
| 3,548,690 | 12/1970 | Horrocks | 30/90.1 |
| 3,548,691 | 12/1970 | Horrocks | 81/9.5 |
| 3,572,189 | 3/1971 | Matthews | 81/9.5 |
| 3,620,104 | 11/1971 | Horrocks | 81/9.5 |
| 3,659,483 | 5/1972 | Matthews | 81/9.5 |
| 3,969,818 | 7/1976 | Maytham | 30/90.1 |
| 3,978,582 | 9/1976 | Maytham | 30/90.1 |
| 4,370,808 | 2/1983 | Maytham | 30/90.1 |
| 4,449,298 | 5/1984 | Putz | 30/90.1 |

Primary Examiner—E. R. Kazenske
Assistant Examiner—Michael D. Folkerts
Attorney, Agent, or Firm—Stephen A. Schneeberger

[57] ABSTRACT

A tool and method for using such tool are provided for removing insulation from wire-wound ignition cable. The tool is manually operated and includes a blade mounted on a body having a cable-receiving passage. The blade is oriented on the tool body in a particular manner to aid in maintaining the integrity of the wire winding on the cable during the severing and removal of the insulation.

11 Claims, 8 Drawing Figures

HAND TOOL AND METHOD FOR REMOVING INSULATION FROM WIRE-WOUND IGNITION CABLE

TECHNICAL FIELD

The invention relates to a tool for removing cable insulation and more particularly to a hand tool for removing insulation from a wire-wound ignition cable. The invention also relates to a method for removing insulation from a wire-wound ignition cable.

BACKGROUND ART

Numerous machines and tools exist for shaving the insulation jacket from electrical cable. The machinery tends to be relatively complex and is adapted for high speed, high volume operation. On the other hand, other tools have been developed which are less automated or in many instances are operated entirely manually. U.S. Pat. Nos. 3,204,495, 3,572,189, 3,659,483, 3,969,818, 3,978,582, and 4,449,298 are illustrative of various insulation-removing tools of varying complexity and suitable in most instances for hand operation. U.S. Pat. Nos. 3,548,691 and 3,620,104 are illustrative of other manually-operated, insulation-stripping tools of possibly less complexity than those of the aforementioned group. Still further, U.S. Pat. Nos. 3,304,605 and 3,548,690 are illustrative of simple manually-operated insulation-removing tools. In most instances, it is required that the tool be capable of quickly and efficiently removing the insulation from the cable without damaging the conductor.

U.S. Pat. No. 3,304,605 describes a simple tubular device having several slots of varying depth in which a manually held cutting blade may be selectively positioned. The U.S. Pat. No. 3,548,690 discloses a simple manually-operated tool having a blade affixed thereto.

In most or all of the aforementioned patents, the cable undergoing insulation removal has a single or multi-stranded center conductor and a surrounding jacket of insulation. In some instances the electrical cable may be of a coaxial type and include an additional dielectric layer and possibly also a braided shield. In those instances, there has been little or no emphasis placed on the angular disposition of the cutting blade relative to the axis of the cable. In certain instances, such as that disclosed in U.S. Pat. No. 3,572,189, the cutting edge is intended to be disposed at an angle other than 90° to the longitudinal axis of the conductor cable so as to provide a screw-feed action.

Certain types of electrical cable and specifically ignition cable, include a helical winding of resistance wire disposed about a central core to provide the electrically conductive path. An example of such wire-wound ignition cable is disclosed in U.S. Pat. No. 3,518,606 wherein a resistance wire is helically wound about a fibrous insulating core to form a wire-wound core. That wire-wound core is then encased in a conventional insulating coating. Various thin binding layers may also exist about the central fibrous core and about the wire winding. A thin releasing layer may also be interposed between the insulation and the wire winding. Typically, a particular manufacturer of wire-wound ignition cable will provide the wire winding in a single direction, either clockwise or counterclockwise as viewed from the end.

To prepare the ignition cable for use with an associated terminal, it is generally necessary to remove the insulation to a depth which exposes the wire-wound core. The wire-wound core is then crimped or otherwise secured in electrically-conducting engagement with the terminal, as illustrated in U.S. Pat. No. 3,518,606. In the mass production of such wire-wound ignition cables with terminals, the insulation has typically been removed from the wire-wound core by a scissor-like or guillotine-like stripper which removes the desired length of insulation with a single cut.

While the aforementioned technique for removing insulation from wire-wound ignition cables is suited for the mass production of ignition cables with terminals, numerous individuals find it necessary and/or desirable to prepare wire-wound ignition cable for joining with an appropriate terminal. Such persons typically include the do-it-yourselfer, the hobbyist, and the racing enthusiast, amongst others. In such instance, care must be taken to preserve the integrity of the resistance wire winding as the insulation is being cut and removed from the cable. The integrity of the resistance wire winding is essential for good electrical connection with the terminal.

DISCLOSURE OF INVENTION

Accordingly, it is a principal object of the present invention to provide a simple and economical method and tool for removing the insulation from wire-wound ignition cable. Included within this object is the provision of a tool which preserves the integrity of the wire winding during the insulation removal operation.

In accordance with the invention there is provided a hand tool for removing insulation from a wire-wound ignition cable of the type having an elongated core of circular cross section and about which a resistance wire is helically wound in a predetermined lead direction and over which a tubular jacket of insulation is disposed. The tool includes a body having a passage or bore therethrough and a blade mounted on a supporting surface thereon adjacent to the bore. The diameter of the passage is only slightly larger than that of the ignition cable to ensure a close sliding fit of the cable therewithin. The blade is rigidly mounted on the supporting surface and includes a cutting edge which extends across the passage at a lead angle thereto and at a depth for cutting at least most of the way through the cable insulation.

Importantly, the direction of the blade lead angle is counter to the lead direction of the wire winding on the cable, relative to the axis of the passage and the cable, to thereby aid in maintaining the integrity of the wire winding in its wound condition on the core during rotation of the body relative to the cable in the predetermined insulation-cutting direction. The lead angle of the blade cutting edge is greater than about 5°, being within a range of about 10° to 30°, and in a preferred embodiment being about 20°. The blade and its cutting edge are disposed at a forwardly-directed rake angle which may typically be about 30°.

For ignition cable in which the wire-wound core and the insulation are of predetermined diameters, the passage in the tool body is also of predetermined diameter and the blade cutting edge is positioned so as to be substantially tangential with the wire-wound core of the cable for cutting through the insulation substantially to the wire-wound core. The tool body is conveniently of plastic and the blade seating surface includes one or more mounting lugs which extend through respective apertures in the planar blade and are heat-staked to fix the blade in position.

BEST MODE FOR CARRYING OUT THE INVENTION

Figure 1:
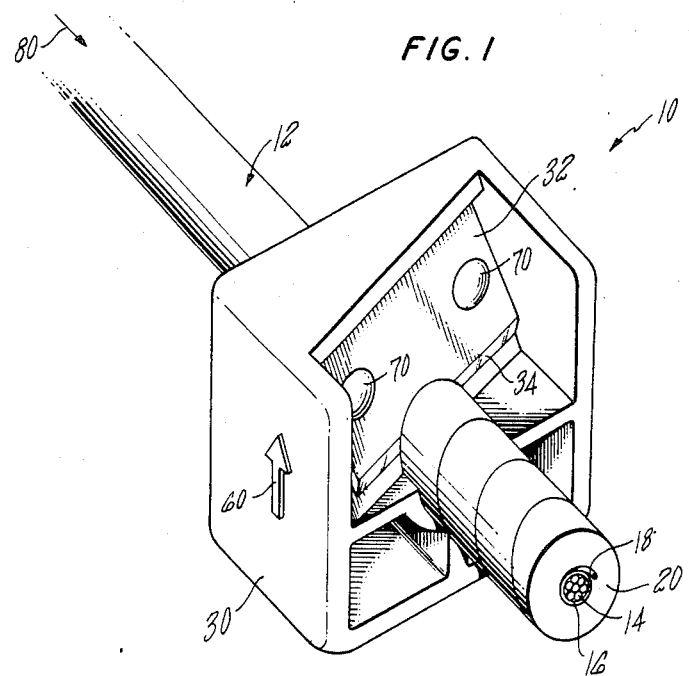
FIG. 1 is a perspective view of the insulation removing tool of the invention in use for removing the insulation from a wire-wound ignition cable.

Referring to the Figures generally and specifically to FIG. 1, a simple and economical hand tool 10 as illustrated for the efficient and safe removal of insulation from a wire-wound ignition cable 12. Referring also to FIG. 8, the ignition cable 12 typically includes a central core 14 of multiple strands of fibrous insulating material, such as fiberglass or the like. The core 14 is typically coated with a thin layer of binding material 16 of elastomeric or polymeric materials in which ferritic materials may be added. This central core 14, 16 is then helically wound with a layer of resistance wire 18 which preferably is a form of stainless steel such as resistance Alloy "C" typically having a diameter of several mils. The spacing of the resistance wire 18 on the core may be varied to vary the resistance of the complete cable and in the illustrated embodiment includes about 40 turns per inch. Typically also, the lead direction or direction in which the resistance wire 18 is wound about the core 14, 16 is usually constant for a given manufacturer of the cable 12. For instance, in the cable 12 illustrated in FIGS. 1, 7 and 8, the lead direction of the winding of resistance wire 18 is the same in each, that being in the clockwise direction and toward the observer when viewed from either end. Stated another way, and referring specifically to FIG. 7, the lead direction of the wound resistance wire is to the left of the axis of the cable when viewed from the top.

A very thin and substantially conductive binding layer (not shown) may be positioned over the combined core 14, 16 and helically wound wire 18 so that the two parts are bound together as a unit. A very thin release layer of graphite, or the like, (not shown) is then disposed about the wire-wound core and is followed by an outer conventional insulating coating 20 of rubber or the like.

Figure 2:
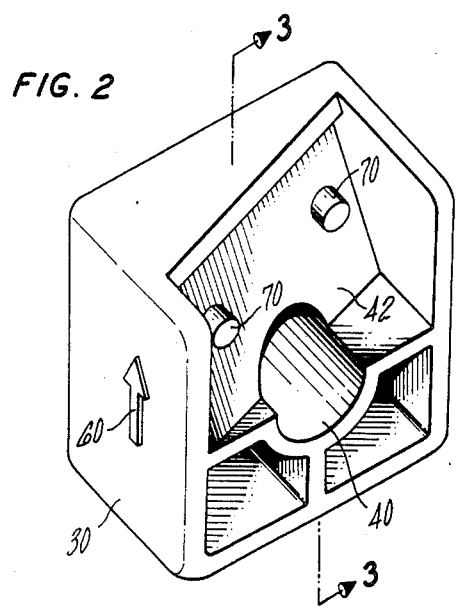
FIG. 2 is a front perspective view of the insulation removing tool without the blade.
Figure 3:
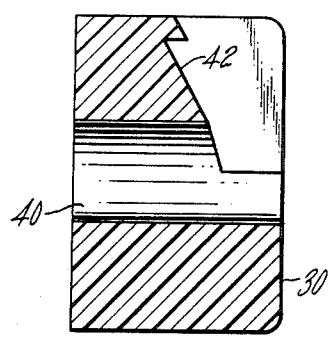
FIG. 3 is a sectional view of FIG. 2 taken along 3—3 thereof.
Figure 4:
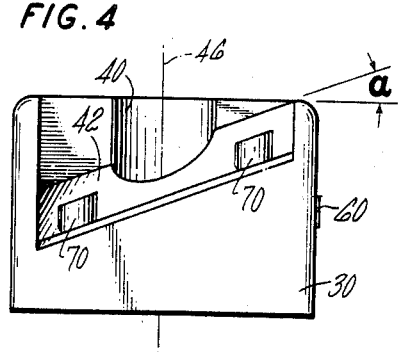
FIG. 4 is a reversed top view of the tool of FIG. 2.

Referring to the insulation-removing tool 10, there is provided a body 30, typically of molded plastic, and a planar cutting blade 32 mounted thereon and having a cutting edge 34. Referring to FIGS. 2-4 in which the tool 10 is illustrated prior to the mounting of blade 32 thereon, the body 30 is seen to include a longitudinal bore or passage 40 of generally circular cross section and having a diameter which is only slightly greater than that of the diameter of cable 12 so that the cable will have a close sliding fit in the passage 40. A blade supporting surface 42 is formed in the body 30, as by molding, to orient the blade 32 and its cutting edge 34 in accordance with the invention. Supporting surface 42 is substantially planar to provide even support for the blade 32. The surface 42 importantly is inclined or skewed relative to the axis 46 of the passage 40 such that the cutting edge 34 of blade 32 has a lead angle $\alpha$ extending in a predetermined lead direction and of predetermined magnitude. Moreover, surface 42 is also inclined to the axis 46 to achieve a forwardly directed rake angle $\beta$ of predetermined magnitude.

Figure 5:
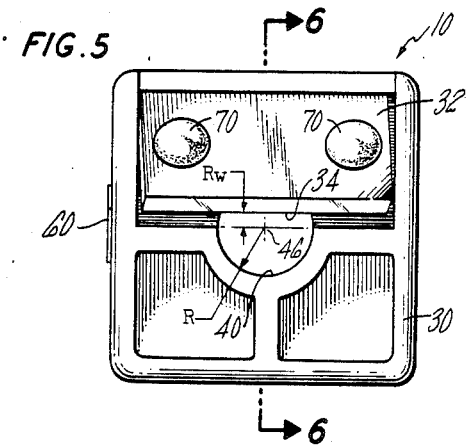
FIG. 5 is a front view of the insulation removing tool having the cutting blade installed.
Figure 6:
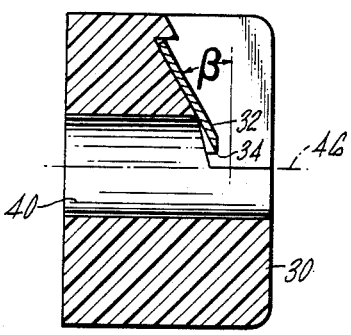
FIG. 6 is a sectional view of FIG. 5 taken along line 6—6 thereof.
Figure 7:
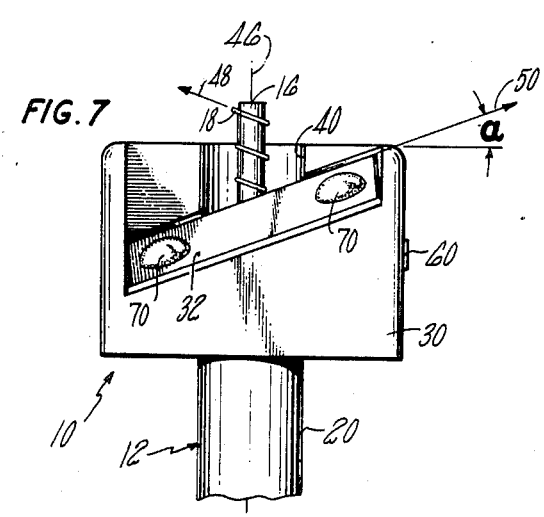
FIG. 7 is a reversed top view of the insulation removing tool of FIG. 5.
Figure 8:
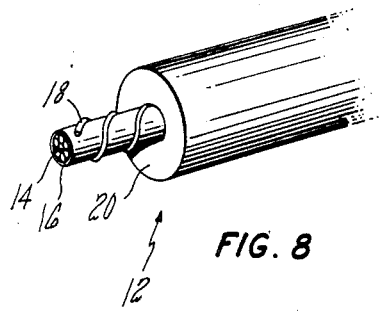
FIG. 8 is a perspective view of a wire-wound ignition cable following removal of the insulation by the tool of the invention.

Referring to FIGS. 5-7, the blade 32 is illustrated in its mounted position on the supporting surface 42 of body 30. The blade 32 is rigidly mounted to surface 42 by a pair of lugs 70 which extend outward from surface 42 and through a corresponding pair of openings or apertures (not shown) in blades 32 and are heat staked. The size of blade 32 and its positioning on mounting surface 42 are such that the cutting edge 34 is offset above the centerline 46 of passage 40 by an amount $R_W$ which is the nominal value of the outside radius of the wire-wound core 14, 16, 18. In the present instance, that dimension is about 0.040 inch. As was mentioned previously, the diameter of passage 40 is only slightly greater than the outside diameter of cable 12 and in the present embodiment, the diameter of cable 12 is 0.315 inch such that the radius, R, of passage 40 is about 0.164 inch. In the event manufacturing tolerances cause the radius $R_W$ of the wire-wound core 14, 16, 18 to slightly exceed its nominal value, the resilient compressibility of the insulation 20 is sufficient for the cable 12 to compress somewhat when urged downwardly by the cutting blade 32 against the upwardly-facing surface defining the lower side of passage 40. Such characteristic enables an effective cutting of the insulation without damaging the wound wire 18.

The blade supporting surface 42 is skewed or inclined about an axis normal to cutting edge 34 such that the lead angle $\alpha$ extends forwardly of a plane normal to centerline 46 in a lead direction which is opposed or counter to the lead direction of the wound wire 18 of the cable 12. This arrangement is seen most clearly in FIG. 7 in which the lead direction of the wire 18 extends to one side of the axis or centerline 46, as represented by the arrow 48, and the lead direction of the cutting edge 34 of blade 32 extends to the other side of centerline 46, as represented by the arrow 50. In the illustrated embodiment and as viewed from above in FIG. 7, the lead direction of the wound wire 18 is generally to the left of axis 46 whereas the lead direction of the blade cutting edge 34 is to the right, such that the blade necessarily extends transversely of the windings of wire 18. Such orientation ensures that the blade edge 34 will not cut into the spaces between successive windings. Importantly also, such orientation of the lead direction of the blade 32 relative to the lead direction of the wire-winding 18 requires a direction of rotation of tool 10 relative to cable 12 as illustrated by the arrow 60 embossed on the side of tool 10 as depicted in FIG. 1. Such direction of relative rotation is in the direction in which the wire 18 is wound about core 14, 16 and serves to ensure the tightness of that winding during the insulation cutting operation. It will be appreciated of course that either the tool 10 or the cable 12, or both, might be rotated to provide the relative rotation. The lead angle $\alpha$ of cutting edge 34 is greater than 5°, being preferably in a range of 10° to 30° and, in the illustrated embodiment is about 20°. Such orientation assures attainment of the objective of the invention.

The blade 32 is inclined about an axis which parallels the blade edge, the inclination being forwardly, in the direction of feed of cable 13 and relative to a plane perpendicular to the centerline 46 at a rake angle $\beta$ which is typically about 30. Such rake angle has been found to provide an end surface to the insulation 20 which, presumably due to the compressibility of the insulation, is substantially normal to the centerline of the cable and is well adapted for connection with a mating terminal.

The cutting and removal of the insulative 20 is provided by rotating tool 10 relative to cable 12 in the direction indicated by arrow 60 while applying a relative axial force to the cable 12 in the direction of cable-feed indicated by arrow 80 in FIG. 1 until the insulation 20 has been cut to the desired axial extent. Then, the axial feed force is substantially reduced or eliminated and the tool 10 is rotated through one or more complete revolutions to sever the insulation in a continuous circle. The helically grooved insulation 20 may then be removed, resulting in the relatively smooth end face to the insulation 20 as depicted in FIG. 8. The exposed wire-wound core 14, 16, 18 may then be conductively affixed to a suitable terminal as by crimping or the like.

Although this invention has been shown and described with respect to detailed embodiments thereof, it will be understood by those skilled in the art that various changes in form and detail thereof may be made without departing from the spirit and scope of the claimed invention.

Having thus described a typical embodiment of my invention, that which is claimed as new and desired to secure by Letters Patent of the United States is:

1. A hand tool for removing insulation from a wire-wound ignition cable, the cable including an elongated core of circular cross section, a wire wound helically in a predetermined lead direction around the core and a tubular jacket of insulation disposed about the wire-wound core, the tool comprising:
    a body having a passage therethrough, the diameter of the passage being only slightly greater than that of the ignition cable to ensure a close sliding fit of the cable within the passage;
    a blade-supporting surface being formed integrally with said body adjacent to said passage; and
    a blade having a cutting edge and being rigidly mounted on said blade supporting surface, said blade cutting edge extending across the passage at a lead angle thereto and at a depth for cutting at least most of the way through said cable insulation, the direction of said lead angle being counter to that of said lead direction of said wire winding on said cable to thereby aid in maintaining the integrity of said wire winding in its wound condition on said core during relative rotation of said body and said cable in an insulation-cutting direction, said passage in said body affording feed of the cable in a cable-feed direction toward said blade, said lead angle of said blade cutting edge being greater than about 5° an said blade further being inclined forwardly in the cable-feed direction about an axis which parallels said blade edge, thereby to orient said cutting edge at a forwardly-inclined rake angle, said rake angle being measured in quadrature with said lead angle.

2. The tool of claim 1 wherein said lead angle of said blade cutting edge is within a range of about 10° to 30°.

3. The tool of claim 2 wherein said lead angle of said blade cutting edge is about 20°.

4. The tool of claim 1 wherein said rake angle is about 30°.

5. The tool of claim 1 wherein the diameters of said body bore, of said insulation on said cable and of said wire-wound core of said cable are predetermined and wherein said blade cutting edge is positioned to be substantially tangential with said wire-wound core of said cable for cutting through said insulation substantially to said wire-wound core.

6. The combination comprising a wire-wound ignition cable and a hand tool for removing insulation from said cable, the cable including an elongated core of circular cross section, a wire wound helically in a predetermined lead direction around the core and a tubular jacket of insulation disposed about the wire-wound core, and the tool comprising:
    a body having a passage therethrough, the diameter of the passage being only slightly greater than that of the ignition cable to ensure a close sliding fit of the cable within the passage;
    a blade-supporting surface being formed integrally with said body adjacent to said passage; and
    a blade having a cutting edge and being rigidly mounted on said blade supporting surface, said blade cutting edge extending across the passage at a lead angle thereto and at a depth for cutting at least most of the way through said cable insulation, the direction of said lead angle being counter to that of said lead direction of said wire winding on said cable to thereby aid in maintaining the integrity of said wire winding in its wound condition on said core during relative rotation of said body and said cable in an insulation-cutting direction, said passage in said body affording feed of the cable in a cable-feed direction toward said blade, said lead angle of said blade cutting edge being greater than about 5° and said blade further being inclined forwardly in the cable-feed direction about an axis which parallels said blade edge, thereby to orient said cutting edge at a forwardly-inclined rake angle, said rake angle being measured in quadrature with said lead angle.

7. The combination of claim 6 wherein said lead angle of said blade cutting edge is within a range of about 10° to 30°.

8. The combination of claim 7 wherein said lead angle of said blade cutting edge is about 20°.

9. The combination of claim 6 wherein the diameters of said body bore, of said insulation on said cable and of said wire-wound core of said cable are predetermined and wherein said blade cutting edge is positioned to be substantially tangential with said wire-wound core of said cable for cutting through said insulation substantially to said wire-wound core.

10. A hand tool for removing insulation from a wire-wound ignition cable, the cable including an elongated core of circular cross section, a wire wound helically in a predetermined lead direction around the core and a tubular jacket of insulation disposed about the wire-wound core, the tool comprising:
    a plastic body having a passage therethrough, the diameter of the passage being only slightly greater than that of the ignition cable to ensure a close sliding fit of the cable within the passage;

a blade-supporting surface being formed integrally with said body adjacent to said passage and being inclined to the axis of said passage and including a mounting lug; and a substantially-planar blade having a cutting edge and a mounting aperture therethrough, said blade being supported on said blade-supporting surface with said mounting lug extending through said mounting aperture and wherein said mounting lug is heat staked into locking engagement with said blade thereby to rigidly mount said blade on said blade-supporting surface, said blade cutting edge extending across the passage at a lead angle thereto provided by said incline of said blade-supporting surface and at a depth for cutting at least most of the way through said cable insulation, the direction of said lead angle being counter to that of said lead direction of said wire winding on said cable to thereby aid in maintaining the integrity of said wire winding in its wound condition on said core during relative rotation of said body and said cable in an insulation-cutting direction, said passage in said body affording feed of the cable in a cable-feed direction toward said blade.

11. The combination comprising a wire-wound ignition cable and a hand tool for removing insulation from said cable, the cable including an elongated core of circular cross section, a wire wound helically in a predetermined lead direction around the core and a tubular jacket of insulation disposed about the wire-wound core, and the tool comprising:

a plastic body having a passage therethrough, the diameter of the passage being only slightly greater than that of the ignition cable to ensure a close sliding fit of the cable within the passage;

a blade-supporting surface being formed integrally with said body adjacent to said passage and being inclined to the axis of said passage and including a mounting lug; and a substantially-planar blade having a cutting edge and a mounting aperture therethrough, said blade being supported on said blade-supporting surface with said mounting lug extending through said mounting aperture and wherein said mounting lug is heat staked into locking engagement with said blade thereby to rigidly mount said blade on said blade-supporting surface, said blade cutting edge extending across the passage at a lead angle thereto provided by said incline of said blade-supporting surface and at a depth for cutting at least most of the way through said cable insulation, the direction of said lead angle being counter to that of said lead direction of said wire winding on said cable to thereby aid in maintaining the integrity of said wire winding in its wound condition on said core during relative rotation of said body and said cable in an insulation-cutting direction, said passage in said body affording feed of the cable in a cable-feed direction toward said blade.

* * * * *